United States Patent [19]
Nolt

[11] 3,724,363
[45] Apr. 3, 1973

[54] FEED MECHANISM FOR A CROP BALER

[75] Inventor: Edwin B. Nolt, New Holland, Pa.

[73] Assignee: Sperry Rand Corporation, New Holland, Pa.

[22] Filed: June 1, 1971

[21] Appl. No.: 148,374

[52] U.S. Cl. .................................100/189, 56/341
[51] Int. Cl. ...............................................B30b 1/00
[58] Field of Search ........100/142, 188, 189; 56/341, 56/343; 198/223; 308/3.8; 49/409

[56] References Cited

UNITED STATES PATENTS

| | | | |
|---|---|---|---|
| 3,517,609 | 6/1970 | Smith et al. | 100/189 |
| 1,031,677 | 7/1912 | Rumsey | 49/409 X |
| 2,953,083 | 9/1960 | McDuffie | 100/189 X |
| 3,030,877 | 4/1962 | McDuffie et al. | 100/142 |
| 3,636,869 | 1/1972 | D'Acremont et al. | 100/189 |

Primary Examiner—William I. Price
Assistant Examiner—C. K. Moore
Attorney—John C. Thompson, George C. Bower, Joseph A. Brown, Larry L. Coats and James J. Kennedy

[57] ABSTRACT

A feeding mechanism that sweeps crops along a feed chamber into a bale case of the baler is of the double bar type with a straight tubular feed finger supporting member and a guide member in reciprocal supporting relation thereto. Rollers on the sides of the supporting member are in constant longitudinal spaced relation and ride in transversely spaced U-shaped tracks on opposite sides of the guide member. The supporting member is connected to an elliptical chain drive located in a drive housing above the feed chamber at the bale case end. The guide member is connected to a rotating crank at the opposite end of the drive housing. The drives actuate the members to move the feed fingers along the feed chamber in a feed stroke for sweeping crops into the bale case and return the feed fingers through the drive housing in a generally parallel relation to the feed chamber.

15 Claims, 11 Drawing Figures

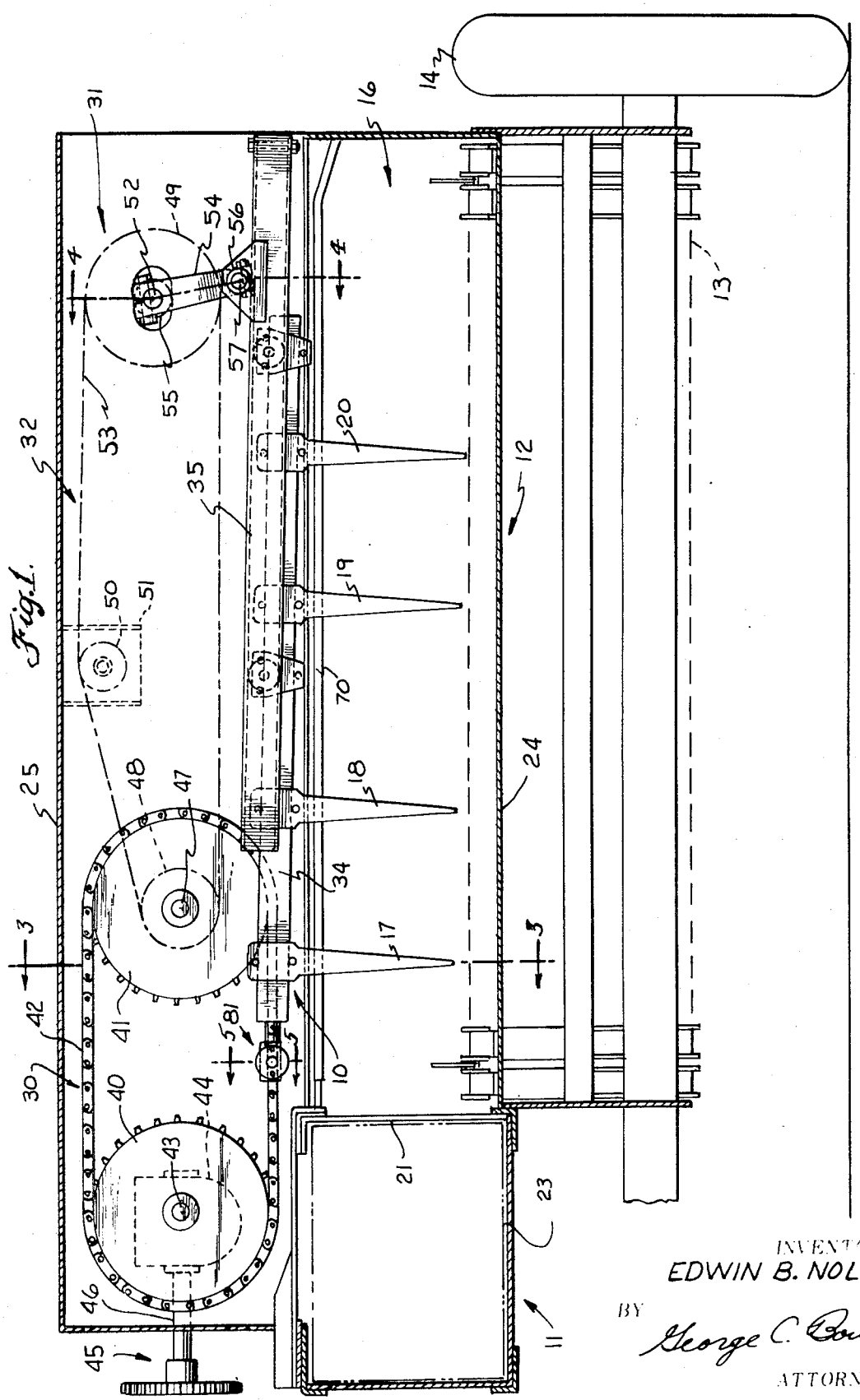

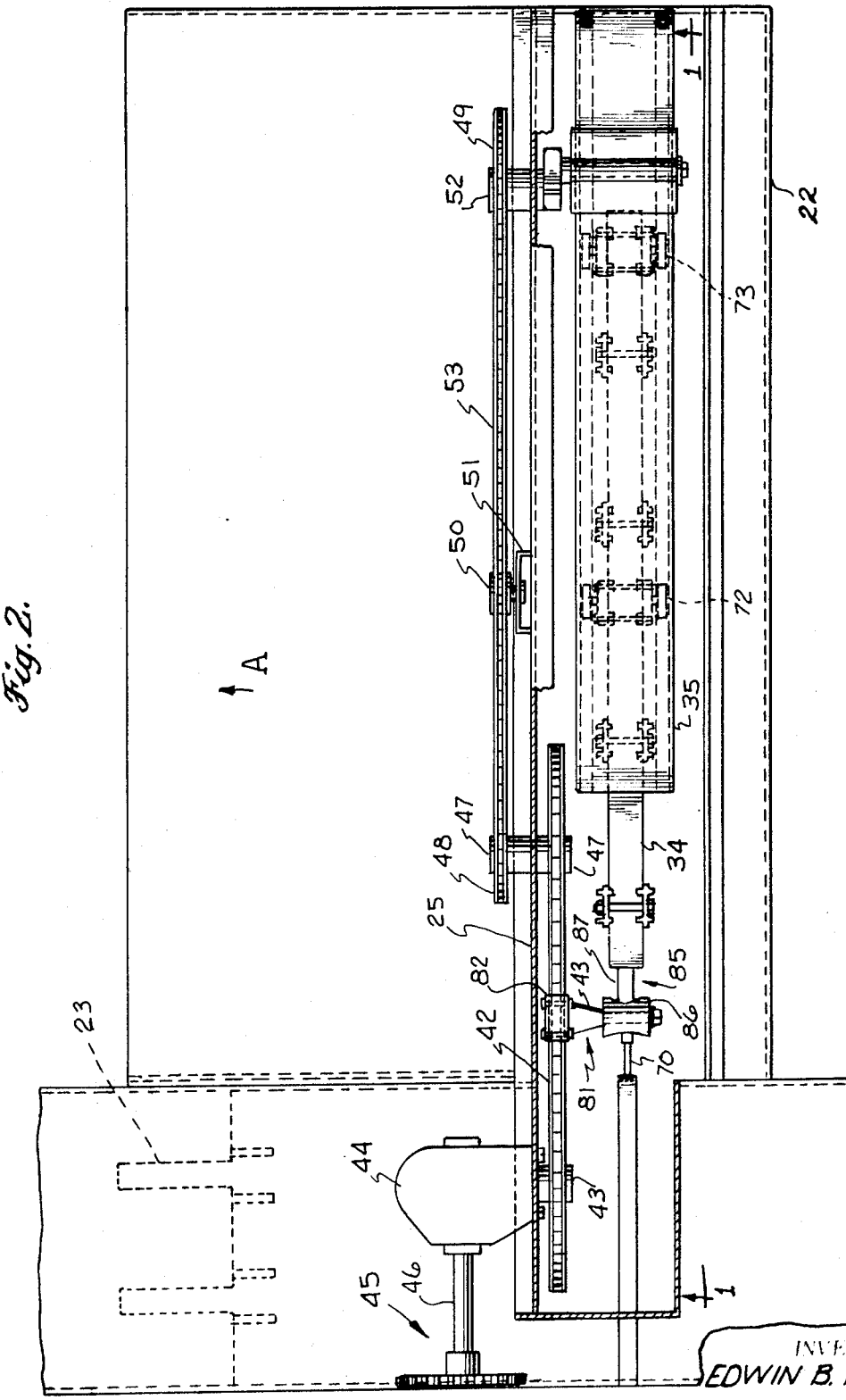

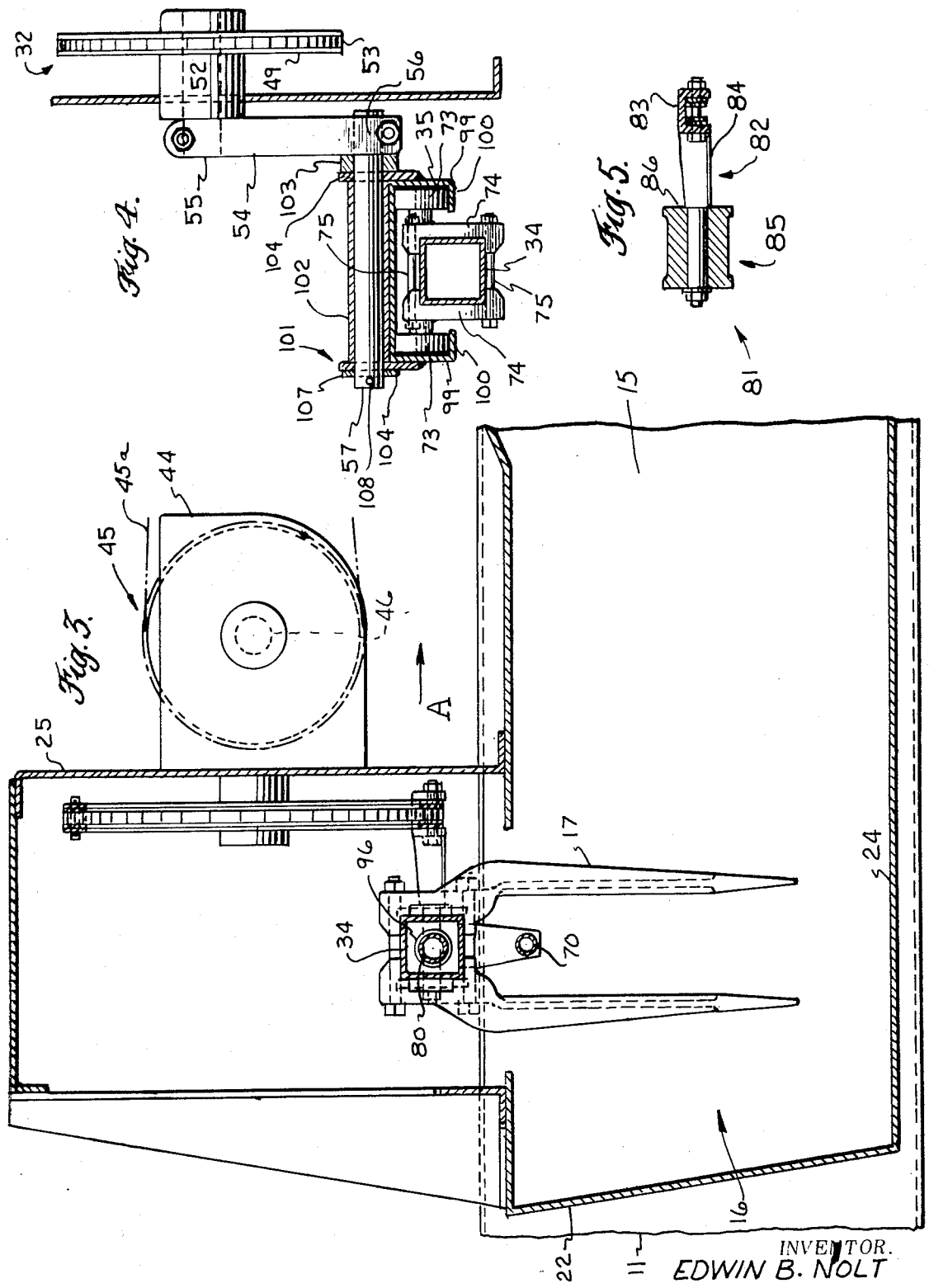

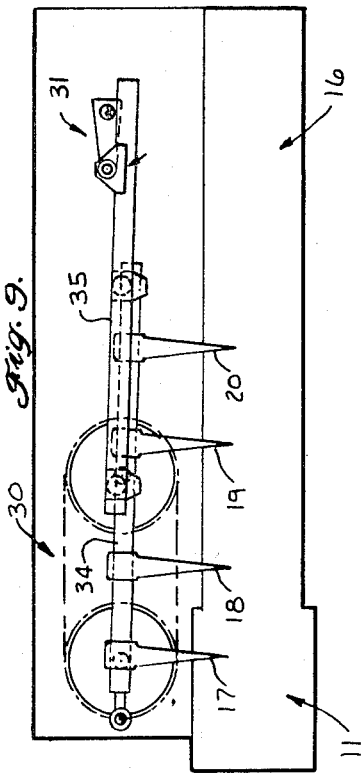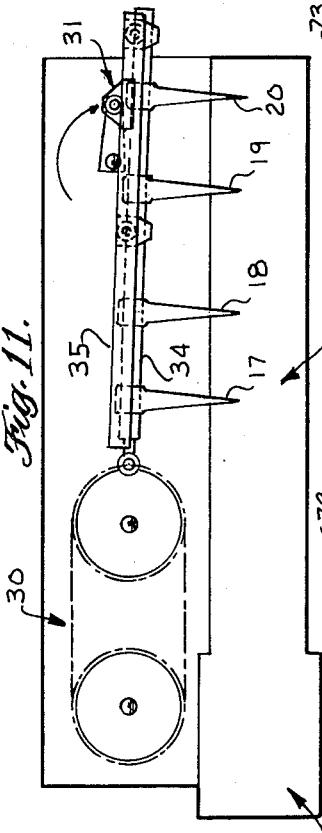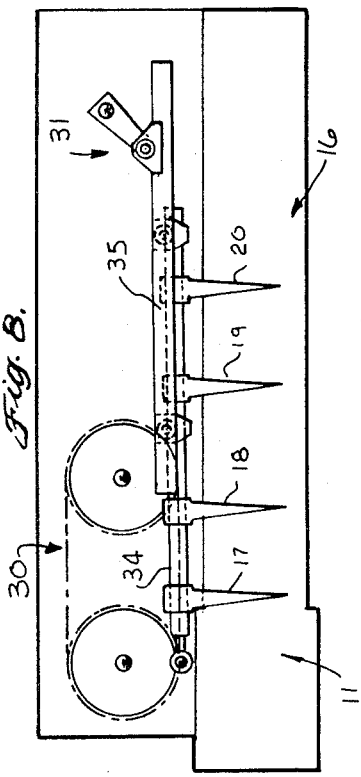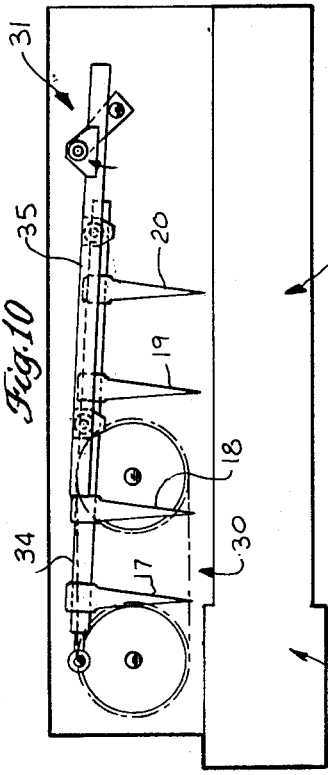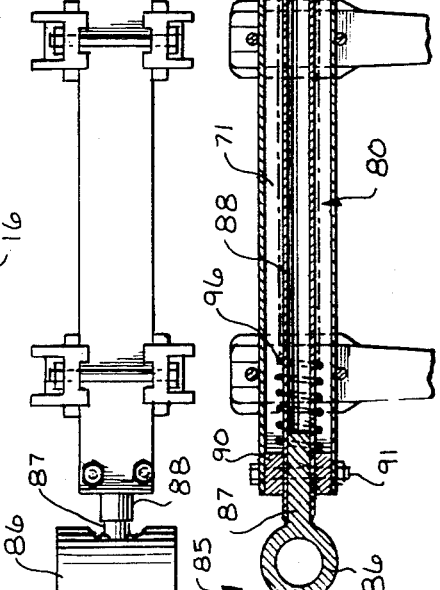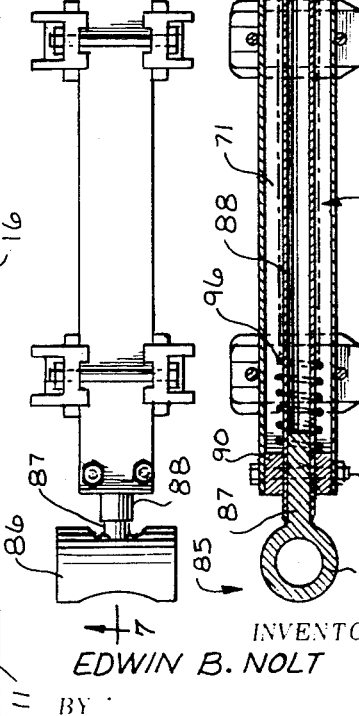

3,724,363

FEED MECHANISM FOR A CROP BALER

CROSS REFERENCE TO RELATED APPLICATIONS

This application discloses features (either wholly or in part) which are set forth and claimed in U.S. application Ser. No. 285,947 for "Improved Mounting Structure for the Feed Mechanism of a Baler" filed Sept. 1, 1972.

BACKGROUND OF THE INVENTION

This invention relates to mobile crop balers and is directed particularly to feeding mechanisms delivering the picked up crop to the bale case.

In the mechanization of the farm there has been a great deal of emphasis on the mechanical harvesting and gathering of crops. One of the machines perfected in the past three or four decades has been the mobile baler which may be either of the tractor pull type or self-propelled type. These types move across fields to pick up crops in windrows or swaths and compress the crops into rectangular shaped bales. The bale is a convenient form for handling the crop manually or by machinery.

A baler should fulfill many requisites to meet the requirements and demands of the farmer and independent operators. These requirements and demands are increasing with the need for better and more economical baling of crops.

The baler shown and described in the U.S. Pat. No. 3,512,535 issued to Charles C. Smith et al. on June 30, 1970, has an improved operation, better shaped bales and higher capacity. This is a new type of baler and is referred to as a double bar type. The feeding mechanism operates at a 100 strokes per minute with an improved entry of the feed fingers into the crop in the feed chamber and clearing of the crop from the feed chamber. This increased rate of operation feeds thinner slices of crop to the bale case for more uniformity in the density of the bale and better bale shape. The increased rate also permits faster movement of the baler for a higher capacity. This baler fulfills these requirements.

In this type of baler with a double bar feed mechanism it is desirable to have the pressure relief spring inside the tubular member supporting the feed fingers, it is also desirable to increase the durability of the feed mechanism and to improve the feeding action.

In the U.S. Pat. application Ser. No. 55,300, now U.S. Pat. No. 3,636,869, filed on July 10, 1970 by Alain F d'Acremont et al. and entitled "Fodder Baler Feed Mechanism" another double bar feeding mechanism is shown. In this feed mechanism, the guide member is pivotally supported by two rotary arms and circularly rotated parallel to itself. The finger supporting bar is pivotally connected at the bale case end to a generally elliptical drive and, at the other end, has shoes pivotally mounted thereon which are slideable in parallel channel sections of the guide member for relative angular movement of the guide member and the finger supporting bar.

It is however desirable to further improve on the double bar feeding mechanism by providing a guide member drive that is less expensive, has fewer parts and has less complicated timing conditions while still having the pressure relief spring inside the feed finger supporting member.

OBJECTS AND SUMMARY OF THE INVENTION

An object of this invention is to improve the durability of the feed mechanism of the double bar type.

Another object of this invention is to improve the feeding action and operation of a double bar type feeding mechanism.

Another object of this invention is to provide a double bar type feeding mechanism with a pressure relief spring inside the feed finger supporting member and an outboard drive that is not subject to extensive timing considerations.

Another object of this invention is to improve the wear characteristics of the double bar type feed mechanism.

In summary this invention comprises a feed mechanism with the elliptically driven feed finger supporting member having transversely and longitudinally spaced sets of supporting elements riding in constant spaced relation on tracks of a guide member having a generally U-shape and fitting around the feed finger supporting member in parallel reciprocal relation therewith.

These and other objects and advantages of this invention will be apparent from the following description and claims taken in connection with the accompanying drawings which illustrate those features of the invention.

BRIEF DESCRIPTION OF THE DRAWINGS

FIG. 1 is a back end view of the feed mechanism of a crop material baler taken along line 1–1 of FIG. 2.

FIG. 2 is a top view of the feed mechanism with the top wall fragmentized.

FIG. 3 is a sectional view of the feed mechanism taken along line 3–3 of FIG. 1.

FIG. 4 is a sectional view of the feed mechanism taken along line 4—4 of FIG. 1 and illustrates the pivotal connection of the guiding supporting member to the crank.

FIG. 5 is a fragmentary view of the finger supporting member connection pin taken along line 5—5 of FIG. 1.

FIG. 6 is a top view of the feed finger supporting member.

FIG. 7 is a sectional view of the feed finger supporting member taken along line 7—7 of FIG. 6.

FIGS. 8–11 are diagrammatic views of four positions of the parallel reciprocating finger supporting means.

INTRODUCTION

In the drawings, the feed mechanism 10 for a crop material baler is shown in detail in connection with fragments of the bale case 11, the feeder case 12 and the pickup 13. The baler is of the mobile pulled type and mounted on two transversely spaced wheels 14 of which only the outboard or right wheel is shown. The baler moves in direction A and the crop material is gathered from the ground by the pickup 13 and delivered through the opening 15 to the feed chamber 16. The four feed fingers 17, 18, 19 and 20 sweep along the feed chamber to carry the crop material towards and into the bale case 11 through the crop material delivery opening 21 in the side of the bale case. The plunger mechanism in and on the bale case is indicated by the plunger 23.

The feeding mechanism, as viewed from the rear, is illustrated in FIG. 1 by sectionally omitting the rear walls 22, (FIGS. 2 and 3). The feeding mechanism 10 comprises a first rotating drive means 30, a second rotating drive means 31, and connecting chain and sprocket drive 32. The first rotating drive means 30 is an oval or elliptical path drive over the bale case 11 and the adjacent end of the feed chamber 16. The second rotating drive means 31 is a circularly rotating crank at the outboard end of the feeder casing and is driven through the inboard first rotating drive means by the crank drive 32. The parallel reciprocating finger supporting means is connected at opposite ends to the first or inboard rotating drive means 30 and the second or outboard rotating drive means 31, respectively, and carries the feed fingers in a linear motion longitudinally along the feed chamber 16 with the lead feed finger 17 traveling through the feed chamber into the bale case. The feed fingers are returned to the initial crop feeding position through the drive housing 25. The parallel reciprocating finger supporting means comprises a feed finger supporting member 34 and the guide supporting member 35. The finger supporting member 34 is attached at its forward end to the inboard rotating drive means and the outboard end of the guiding supporting member is pivotally connecting to the outboard rotating drive means. The finger supporting member 34 is attached to and supported by the guide supporting member in relative linear motion therebetween. The finger supporting member 34 has the feed finger 17, 18, 19 and 20 attached thereto for movement by the finger supporting member through the feed chamber and return to the initial crop material sweeping position. The finger supporting member 34 and guide supporting member 35 move relatively in relation to one another through the cycle or path of travel.

DRIVES

As best illustrated in FIGS. 1-3, the inboard or first rotating drive means comprises two sprockets 40 and 41 and a link chain 42. The sprockets 40 and 41 are of equal size so that the upper and lower runs of the chain are parallel to the feed chamber. The sprocket 40 is mounted on the shaft 43 of the gearbox 44. The gearbox 44 is driven from the baler drive through chain 45a, the sprocket 45 and shaft 46. Thus the feed mechanism is driven in timed relation with the plunger. The sprocket 41 is drivingly mounted on the shaft 47. The shafts 43 and 47 are horizontally spaced to impart an oval or elliptical shape to the chain 42 with upper and lower runs equal and parallel. The shaft 47 is rotatably mounted in the vertical drive housing wall 25. On the opposite side of the wall is the smaller sprocket 48 of the outboard crank drive 32. This drive includes a chain 53 a driven sprocket 49 larger than the drive sprocket 48 and an idler sprocket 50 rotatably mounted by the bracket 51 on the wall 25. The driven sprocket 49 is keyed to the shaft 52 rotatably mounted in the wall 25. The shaft extends therethrough with the crank arm 54 extending radially therefrom. The crank arm 54 has clamping yokes 55 and 56 on opposite ends for gripping attachment to the shaft 52 and the crank support pin 57. The distance between the centers of the shaft 52 and the pin 57 is substantially equal to the distance between the center of the shaft 47 and the point of engagement of the teeth of the sprocket 41. The shaft 52 however is positioned above the projection of the line through the centers of the shafts 43 and 47 so that the pin 57 is above the horizontal projection of the lower run of the chain 42. The chain 42 and the crank 54 are driven in timed relation by the outboard crank drive 32. The crank pin 57 subscribes a circular path of travel in timed relation with the oval path of travel of the chain 42. The diameter of the sprockets 40 and 42 is in the order of the length of the feed fingers projecting below the feed finger support member and greater than the length of the feed fingers projecting below the crop guard rod 70 so that when the feed fingers are returned to the initial sweeping position the feed fingers will be withdrawn into the drive housing.

FEED FINGER SUPPORTING MEMBER

The feed finger or first supporting member is shown in detail in FIGS. 4, 6 and 7 and basically comprises a square shaped tubular member having a passage 71 extending the length of the member and with openings at the ends thereof. The feed fingers 17-20 are fastened to the tubular member in distributed spaced relation. The feed fingers are each formed of two identical prongs having mounting portions at the upper end with square shaped notches for snuggly fitting on the tubular finger supporting member 34 and secured together and to the member by fastening means such as bolts extending transversely across the tubular member and secured by nuts. The feed fingers are thus securely fastened to the feed finger supporting member.

Guide support rollers 72 and 73 are mounted in sets on the upper ends of U-shaped brackets 74. The brackets are securely and firmly attached to the finger feed supporting member 34 by two fastening means 75 on top and one on the bottom. The rollers rotate about axes perpendicular to the support member and are positioned on opposite sides of the tubular member. The rollers 73 are positioned adjacent the end of the supporting member 34 and the rollers 72 are positioned intermediate the ends such as about the middle or midpoint of the supporting member 34 for rolling in the guiding supporting member 35.

The feed finger supporting member 34 is pivotally connected to the chain 42 through a feed pressure relief means 80 and a pivotal connection 81. The pivotal connection comprises a chain connector 82 with an attaching U-shaped bracket 83 fitting as a link of the chain 42 and a stub shaft 84 extending perpendicularly to the chain 42. The feed pressure relief means 80 has a single piece connector 85 with a sleeve 86 and shaft portion 87. The sleeve 86 is transverse to the supporting member and rotatably mounted on the stub shaft 84. Appropriate washers and fastening means are mounted on the stub shaft 84 to secure the sleeve 86 thereto. The shaft portion 86 extends perpendicularly to the sleeve. The shaft portion 87 fits in the end of an overload extending tubular rod 88 extending longitudinally within the supporting member. The rod is slideably mounted in the bearing block 90 secured to the left of the supporting member 34 by bolts 91, as illustrated in FIGS. 6 and 7. At the inner end of the tubular rod 88, the stem portion of a T-shaped cross sectional fastening member 89 is secured to the tubular rod 88 by bolt 94, as illustrated in FIG. 7. A piston-like means 93 is fastened to the end of the tubular member 88. A control spring 96 is positioned between the bearing block 90 and a flanged washer 95 which bears against the piston-like means. The impelling force applied to the connection 85 by the chain 42 is transmitted through the overload extension rod 88 to the spring 96 and to the feed finger supporting member through the bearing block 90. Thus, if for any reason the feed fingers 17 to 20 become overloaded the spring 96 will be compressed and the overload extension rod will travel with the chain 42. This feature is particularly desirable in controlling the density of the packing of the crop material in the bale case and permitting the lead finger 17 to stop when the crop material becomes too dense in the bale case. During normal operation and loads on the feed fingers the spring 96 will transmit the forces to the feed finger supporting member without the spring being substantially compressed.

The guide or second supporting member 35 is the other member of the parallel reciprocating finger supporting means. This member is best illustrated in FIGS. 1, 2 and 4 and has a length comparable to the finger supporting member 34. In this embodiment the lengths of these two members are equal. The guiding supporting member has a U-shape in cross section and in width is approximately three times the width of the feeder finger supporting member. The sides 99 extend downwardly from the top wall or main portion 98 extending horizontal. The sides and main portion are about equal to the length of the side of the supporting member 34. Along the lower edges the sides 99 are bent at right angles to form tracks 100 for supporting the rollers 72 and 73. The rollers are in sets longitudinally spaced a constant distance and ride in the tracklike channel means formed by the top wall, sides and flanges. The rollers 72 and 73 are mounted adjacent the top wall of the finger supporting member and support the finger supporting member so that it overlaps with the sides of the guiding supporting member and nests within the U-shape. The guide supporting member is made of high strength steel and shaped to have a low twisting deflection.

The crank pin 57 of the crank 54 is attached to the guiding supporting member adjacent the outboard end of the member and over the top surface. In the described embodiment the crank pin is rotatably supported approximately one-fifth of the total length of the member from the outboard end. The crank pin support bracket 101 comprises two generally triangular shaped plates 104 welded to the side walls 99 of the guiding supporting member. A sleeve 102 with straps 105 are above the top wall and extending across the width of the supporting member between the plates and welded thereto for firmly attaching the sleeve thereto. The crank pin 57 snugly fits in the sleeve 102 and has spacer 103 to separate the bracket 101 from the crank 54. On the other end washer 107 bears against the retention pin 108 holding the guiding supporting member on the crank pin. The crank pin 54 rotates in the sleeve 102 for relative rotation of the crank and the sleeve. The outboard end of the feed finger supporting member follows an elliptical path while the guide supporting member follows a circular path. The rollers on the member 34 roll on the guides or tracks 100 as the finger support member follows the oval path of the first rotating drive means and the guiding support means follows a circular path. Through these rollers, the guiding supporting member supports the finger support member. Rotative or twisting forces applied to the member 34 are transmitted to the main portion or wall 98 and the sides 99 of the guide supporting member 35. Due to the stiffness of this member these forces are carried by the crank pin 57. The support member is relatively stiff to the longitudinal and lateral bending forces applied to the feed fingers by the crop feeding.

OPERATION

The parallel reciprocating finger supporting means is carried by the first and second rotating drive means through 360 degrees of travel in a range of positions. The major ones are illustrated in FIGS. 8, 9, 10 and 11. The connecting pivot 85 and the crank pin 57 move in timed relation through 360 degrees with the pivot connection 85 following the oval path of the chain and the crank pin 57 following a circular path of the crank 54. When the pivot pin 85 is in the mid-position of the lower run of the chain as illustrated in FIG. 1 the crank pin 57 is nearly at the bottom of the circular path as shown in the same figure. Similarly, when the pivot pin 85 is in the mid-point of the upper run of the chain, the crank pin 57 will be correspondingly at the top of the circular path. Since the crank 54 and the sprockets 40 and 41 are substantially the same, the radius of the path from the mid-point of the lower run from the mid-point of the upper run is longer than the circular path subscribed by the pin 57. Therefore the chain 42 travels at a higher speed than the crank 57 for the pins to reach the respective points in timed relation.

In the downward movement into the initial crop engaging position shown in FIG. 11 the finger supporting member 34 and guiding supporting member 35 are coincident in length since the connecting pin 85 and the crank pin 57 are both moving down in a circular arc having the same radius. This means that the finger supporting means and the fingers 17–20 are in the initial positions of the cycle in entering the hay moving vertically. The rear finger 20 may move close to the outboard wall of the feed chamber for clearing the corner of the casing of any accumulation of hay. This permits the feed chamber to be comparable in width to the pickup unit and for the pickup unit to receive hay from along its entire length without the hay packing at the outboard end of the feed chamber which eventually would cause the packing to occur along the substantial portion of the length of the feed chamber which renders balers inoperative. In the crop deliver position, as shown in the FIG. 1, the feeder fingers are moving linearly along the feed chamber and the lead finger 17 enters into the bale case at the end of the linear motion. After the lead finger is in the bale case, the finger supporting means is lifted by the chain going around the sprocket 40 so as to subscribe an upward and circular path and force the hay into the upper left corner of the bale case so that the bale case is entirely filled for a properly shaped bale. The trailing fingers 18, 19 and 20 are lifted in sharp circular paths from the fed crop. This withdrawal of the fingers in the final stages of the delivery positions is substantially vertically as is the downward movement to the initial feed positions. Correspondingly the feed fingers are returned to the initial outboard positions by a substantially linear movement through the housing of the drives. As is seen from the diagrammatical illustrations of FIGS. 8–11 the finger supporting member and the guiding supporting member maintain a substantially parallel horizontal relation. At the commencement of the withdrawal motion and at the commencement of the return of the feed fingers the finger supporting means is slightly tilted.

The motion of the finger supporting member 34 is supported at its lead end by the connections 81 and 85. The other end of the feed finger supporting member 34 is supported and guided by the guiding supporting member 35 through the rollers 72 and 73. The spacing of these rollers connects the two supporting members in linear sliding relation to one another. On the delivery stroke the arc of the pin 57 of the crank 54 and the lower run of the chain 42 are moving substantially parallel to the feed chamber to impart substantially parallel movement to the finger supporting means except for a slight tilt at the end of the stroke.

The distribution of the twisting forces or torques between the two members 34 and 35 and the member 35 and the crank pin 57 are important. The parallel reciprocating finger supporting means is subject to different loads from different directions. The major and largest force is the compression force applied on the lead finger 17 on filling the bale case with the charge of hay, particularly in compressing the hay into the upper left hand corner of the bale case. The bale case loading force on the feed finger 17 is primarily longitudinal to the feed chamber and creates an upward rotative force around the chain connector 82. This force is applied to the guide member 35 through the rollers 72 and 73. This creates a longitudinal twisting force in the guide member which is easily carried by due to the stiffness of this member and applied to the crank pin 57. The feed fingers 18,19,20 as well as 17 apply a lesser but similar force to the members 34 and 35 and sweep the crop material along the feed chamber.

Another force of note is applied to the sides of the feed fingers by the incoming crops from the pickup 13. This creates a turning action on the tubular member 34 which is transmitted to the chain connector 82 and to the guide member 35 by the rollers 72 and 73.

From the description of these forces the importance of the transference eventually to the baler frame must be accomplished with a minimum of wear and distortion of the dynamic members. The guide tracks 100 and the rollers 72,73 are spaced transversely on opposite sides of the tubular feed finger support member and spaced from the sides of the tubular member to oppose the twisting forces applied to the tubular member, particularly those applied to the feed fingers. The rollers are also spaced longitudinally to distribute the longitudinal turning forces such as applied by the leading finger. The longitudinal spacing between the end set of rollers 73 and the intermediate set of rollers 72 remains constant throughout the path of travel of the parallel reciprocating finger support means. Thus the reciprocal interconnections are spaced a distance to opposite both the longitudinal and lateral twisting or bending forces applied to the parallel reciprocating finger supporting means. The wear of the rollers and rails or tracks are well within acceptable limits. The crank pin 57 spanning the guide member receives the forces on the guide member and is firmly held by the crank arm. The guide member 35 in the embodiment shown and described has little play or twisting action. The tubular member 34 has a slight twist or play, this is referred to as stability of the tubular member. This stability is very good and remains so throughout extended operation of the baler due to the minimal wear of the rollers and rails or tracks.

The rollers are traveling on the member receiving the distributed forces which is least likely to become distorted. If the tubular member 34 is distorted under heavy forces this distortion does not affect the reciprocating relation of the two members.

The positioning of the tubular member 34 within the channel shaped member 35 and the positioning of the rollers in transversely spaced relation on opposite sides of the tubular member permits the free movement of the tubular member past the crank pin. This provides the selection of the desired overlap between the members and the positioning of the crank 54 closer to the elliptical or oval shape drive. In the traverse of the movement of the parallel finger supporting means, the tubular member passes the crank as shown in FIG. 11 and the trailing feed finger 20 is at the crank pin when the crank pin is at its maximum downward movement. The feed finger 20 is, therefore, moving substantially downward and penetrating the crops in the feed chamber in a downward circular arc adjacent to the end wall. The pivotal connection 81 is also at the maximum downward movement. The parallel feed finger supporting member is parallel to the feed chamber and remains parallel as the feed fingers penetrate the crop material. The trailing feed finger 20 moves substantially vertically downwardly well into the outboard corner of the feed chamber to clear the hay from this corner.

Thus, in addition to improved durability, the parallel feed finger supporting means has an improved parallel action resulting from the positioning of the tubular member inside of the channel shape member and interconnecting the members by rollers exterior to the tubular member and interior to the channel shaped guide member.

Functionally the relationship of the tubular member and the guide member provides for a different distribution of the forces between these two members. The spacing of the rollers exteriorly from the sides of the tubular member and riding the rollers on rails or tracks also spaced transversely from the sides provides for an adequate amount of wearing surfaces at a location to utilize greater leverage in opposing the forces on the tubular member. This satisfactorily increases the wear life of these members thereby maintaining the stability of the tubular member, breakage of the parts of the feeding mechanism, minimizing damage from excessive forces and eliminating damage to the dynamic elements that would effect the operation of the feeding mechanism.

SUMMARY OF FEATURES AND ADVANTAGES

It is seen from the foregoing description that the feeding mechanism, with the two piece parallel reciprocating finger supporting means actuated at the inboard bale case end by a generally elliptical drive and at the outboard end and by a circularly rotating drive, is substantially improved and more durable. The longitudinal and lateral twisting forces applied to the parallel reciprocating finger supporting means are countered by the stiff guide supporting member and the crank pin of the circular outboard rotating means or crank rather than the chain of the elliptical drive and the pivotal connection thereto. The positioning of the finger supporting member within a substantially larger guide supporting member provides for a greater versatility in the type and configuration of the guide supporting member. This combination permits the better utilization of the space within the drive housing and of the high strength steels commercially available to provide a guide supporting member highly resistant to torsion forces at an acceptable cost.

One of the most important advantages of the guide supporting member being on the outside is that the inner passage of the feed finger support member can accommodate a spring pressure relief means. The feed fingers may be limited to actuating forces less than the feed fingers breakage strength. This also increases the durability and reliability of the feeding mechanism.

Further, with the guide supporting member outside of the feed finger supporting member, the two members have a larger amplitude of overlap than previous machines. This improves substantially the parallel movement of the parallel reciprocating finger supporting member and reduces the tilt of the finger supporting means so that the crop guard rod may be straight throughout the length of the feed chamber. This increases the size of the feed chamber and the capacity of the machine.

While this invention has been described in connection with a single embodiment it will be understood that this embodiment is capable of modification and that this description is intended to cover any variations, uses or adaptations following, in general, the principles of the invention and including such departures that the present disclosure has come within known or customary practice in the art to which the invention pertains, and are within the scope of the invention of the limits of the appended claims.

Having thus described my invention, what I claim is:

1. A feed mechanism for sweeping crop material from a feed chamber into a bale case of a baler comprising:

a first drive over the bale case and feed chamber in the form of two sprockets and an endless chain passing thereover, a second drive in the form of a single rotating crank, means for interconnecting said first drive and said second drive for rotation of said drives in timed relation, a first supporting member extending generally parallel to said feed chamber and having downwardly extending feed fingers connected thereto, means for pivotally connecting one end of said first supporting member to said endless chain for actuating said first supporting member in a generally elliptical path, a second supporting member being relatively stiff to longitudinal and lateral bending forces and having a pivotal connection connecting said second supporting member to said single crank, said second supporting member having a top wall, transversely spaced sides extending downwardly therefrom and inward flanges on said sides spaced from said top wall to form transversely spaced track-like means with said sides and top wall, said first supporting member having two sets of supporting elements with the supporting elements of each set transversely spaced on opposite sides of said first supporting member, one of said sets being intermediately positioned and the other set being adjacent the end opposite to the end connected to said first drive means, said supporting elements riding in said track-like means in constant relation to one another, the parts be so arranged and constructed that as the supporting elements mounted on the first supporting member reciprocate within the second supporting member during rotation of said first and second drives, the relatively stiff second supporting member resists longitudinal and lateral bending forces imposed on it as the feeder fingers on the first supporting member contact crop material and sweep the material into the bale case.

2. A feed mechanism as set forth in claim 1 wherein said supporting elements are rollers.

3. A feed mechanism as set forth in claim 1 wherein said pivotal connection of the first supporting is transversely longer than the transverse width of said first supporting member.

4. A feed mechanism as set forth in claim 1 wherein said other set of supporting elements travels past said pivotal connection of said second supporting member.

5. A feed mechanism as set forth in claim 1 wherein said pivotal connection of said second supporting member is spaced in from the end of said second supporting means.

6. A feed mechanism as set forth in claim 1, said first supporting member is tubular and a pressure relief means is provided therein connecting said means pivotally connected to said endless chain to said supporting member.

7. A feeding mechanism for a hay baler having a bale case with a feed opening in a vertical side wall thereof, a plunger reciprocable in said chamber and past said opening, a hay receiving platform extending from said feed opening and means operable transversely of said reciprocating plunger over said platform for feeding hay into said bale case, said feeding means comprising finger feed supporting means spaced above and extending along said platform, and having a first supporting member and second supporting member in reciprocal overlapping relation with said first supporting member, feed fingers connected to and depending downwardly from said first supporting member, means for reciprocating said feed finger supporting means in timed relation with said plunger for periodically causing said fingers to engage hay on said platform and convey the hay into said bale chamber, said reciprocating means including a first generally elliptical drive and a second crank drive and first and second pivotal means for connecting said first and second supporting members to said first and second drives, respectively;

said second supporting member being relatively stiff to longitudinal and lateral bending forces and having track-like channels on opposite sides thereof in facing relation, and said first supporting member reciprocably positioned between said channels and having two sets of supporting elements with the supporting elements of each set transversely spaced on opposite sides of said first supporting member in said channels, said sets being longitudinally spaced apart and constant in relation to one another whereby said relatively stiff second supporting member receives the longitudinal and lateral bending forces through said transversely and longitudinally spaced supporting elements.

8. A feeding mechanism as set forth in claim 7 wherein said supporting elements are rollers.

9. A feed mechanism for sweeping crop material from a feed chamber into a bale case of a baler comprising a first drive means rotating in a generally elliptical path, a single crank drive means, first supporting means carrying downwardly projecting feed fingers and pivotally connected to said first drive means at the bale case end, a second supporting means having means pivotally connecting said second supporting means at the outboard end to said single crank drive means, said first supporting means reciprocally mounted on said second supporting means in linear reciprocal relation as said rotating drive means rotate said supporting means in timed relation to sweep said feed fingers through said feed chamber,
characterized by
said second supporting means having a generally horizontal and longitudinal top wall and downwardly extending track-like means extending longitudinally along said top wall on opposite sides thereof, said second supporting means, in cooperation with said top wall and said downwardly extending track-like means, being relatively stiff to longitudinally and laterally bending forces; and
said first supporting means positioned underneath said top wall and between said track-like means and having two sets of supporting elements spaced longitudinally a constant distance and each set having supporting elements on opposite sides thereof and said constantly spaced supporting elements ride in said respective track-like means of said second supporting means to maintain the stability of said feed mechanism.

10. A feed mechanism as set forth in claim 9 wherein said support elements are rollers.

11. A feed mechanism as set forth in claim 9 wherein said sets of supporting elements are attached intermediate the ends of said first supporting means and adjacent the end opposite to the end attached to said first drive means.

12. A feed mechanism as set forth in claim 9 wherein said first supporting means is of a square tubular shape and said track-like means are sides extending downwardly and flange means spaced from said top wall for said rollers to reciprocate along said flange means and said top wall for transmission of forces to said second supporting member.

13. A feed mechanism as set forth in claim 9 wherein a pressure relief spring means is provided within said first supporting means operatively connected between said first drive means and said first supporting means.

14. A feed mechanism for a baler having a transversely extending feed chamber which extends at right angles to a bale case, said feed mechanism sweeping crop material from the feed chamber into the bale case and comprising:
first and second transversely spaced apart drives movable over said bale case in timed relation to each other,
first and second support members, said first support member having downwardly extending feed fingers connected thereto,
first and second means connecting said first and second support members to said first and second drives, respectively, said first and second connecting means being movable relative to each other as said first and second drives move over the bale case in timed relation to each other,
said second support member having spaced apart transversely extending track-like members and means above and interconnecting the track-like members,
said first support member having two sets of spaced apart supporting elements mounted thereon in constant relation to each other and to the first support member, the supporting elements of each set being transversely spaced on opposite sides of said first supporting member,
said supporting elements riding in said track-like members and maintaining the first and second support members in fixed alignment one to the other as they reciprocate towards and away from each other as the drives move over said bale case, the parts being so arranged and constructed that as the supporting elements mounted on the first supporting member reciprocate along the track-like members of the second supporting member, the second supporting member resists longitudinal and lateral bending forces imposed on it as the feeder fingers on the first supporting member contacts crop material and sweeps the material into the bale case.

15. A feed mechanism as set forth in claim 14 wherein the first connecting means connects the end of the first support member adjacent the bale case to the first drive means, and wherein one of said sets of spaced apart elements is intermediately positioned along the first support member and the other set of spaced apart supporting elements is positioned adjacent to the end opposite to the end connected to said first drive means.

* * * * *